United States Patent [19]

Dao-Trong et al.

[11] Patent Number: 5,517,438
[45] Date of Patent: May 14, 1996

[54] FAST MULTIPLY-ADD INSTRUCTION SEQUENCE IN A PIPELINE FLOATING-POINT PROCESSOR

[75] Inventors: Son Dao-Trong, Stuttgart; Juergen Haas, Tuebingen; Rolf Mueller, Boeblingen, all of Germany

[73] Assignee: International Business Machines, Corporation, Armonk, N.Y.

[21] Appl. No.: 278,522

[22] Filed: Jul. 20, 1994

[30] Foreign Application Priority Data

Sep. 29, 1993 [EP] European Pat. Off. .............. 93115706

[51] Int. Cl.$^6$ ..................................................... G06F 7/38
[52] U.S. Cl. .......................................... 364/748; 364/736
[58] Field of Search ...................... 364/748, 736

[56] References Cited

U.S. PATENT DOCUMENTS

| | | | |
|---|---|---|---|
| 4,916,651 | 4/1990 | Gill et al. ................................ | 364/736 |
| 4,969,118 | 11/1990 | Montoye ................................ | 364/748 |
| 5,204,828 | 4/1993 | Kohn ..................................... | 364/736 |
| 5,212,662 | 5/1993 | Cocanougher et al. ............... | 364/748 |
| 5,241,493 | 8/1993 | Chu et al. ............................. | 364/748 |
| 5,375,078 | 12/1994 | Hrvsecky et al. ..................... | 364/736 |

OTHER PUBLICATIONS

Patent Abstracts of Japan, vol. 013, No. 444 (E-828), 5 Oct. 1989, & JP-A-01 170 111 (Hitachi Ltd.) 5 Jul. 1989 (abstract).

IBM J. Res. Dev. (USA), IBM Journal of Research and Development, Jul. 1992, USA, 36, 4, 733-749 ISSN 0018-8646 Dao-Trong.

S et al. "A Single-Chip IBM System/390 Floating-Point Processor In CMOS", p. 734, column 1, line 21-line 43; FIG. 1.

Primary Examiner—David H. Malzahn
Attorney, Agent, or Firm—Eugene I. Shkurko; Richard M. Goldman

[57] ABSTRACT

A pipeline floating point processor in which the addition pipelining is reorganized so that no wait cycle is needed when the addition uses the result of an immediately foregoing multiplication (fast multiply-add instruction). The reorganization implies the following changes of an existing data flow of the pipeline floating processor: data feed-back via path ND of normalized data from the multiplier M into the aligners AL1 and AL2; shift left one digit feature on both sides of the data path for taking account of a possible leading zero digit of the product, and special zeroing of potential guard digits by Z1 and Z2; exponent build by 9 bits for overflow and underflow recognition, and due to an underflow the exponent result, is reset to zero on the fly by a true zero unit (T/C).

2 Claims, 18 Drawing Sheets

| ADD: | STAGE 1 | STAGE 2 | STAGE 3 |
|---|---|---|---|
| | OPERAND READ OPD1/OPD2 | | |
| | | ALIGNMENT OPD1 OPD2 | |
| | | | ADDITION OPD1 +OPD2 |

FIG.2A
Prior Art

| MULTIPLY: | STAGE 1 | STAGE 2 | STAGE 3 |
|---|---|---|---|
| | OPERAND READ | | |
| | | PARTIAL TERMS | |
| | | | ADDITION PRODUCT |

| MULTIPLY ADD: | STAGE 1 | STAGE 2 | STAGE 3 | STAGE 4 | STAGE 5 |
|---|---|---|---|---|---|
| | OPERAND READ (MULT) | WAIT | OPERAND READ (ADD) | ALIGNMENT | ADDITION |
| | | PARTIAL TERMS | WAIT | WAIT | |
| | | | PRODUCT | | |

FIG.5

| MULTIPLY(A) ADD(B): | STAGE 1 | STAGE 2 | STAGE 3 | STAGE 4 |
|---|---|---|---|---|
| | OPERAND READ (MULT) OPD1/OPD2 A1 | OPERAND READ (ADD) OPD1 B1 | ALIGNMENT (ADJUST) B2 | ADDITION B3 |
| | | PARTIAL TERMS A2 | PRODUCT A3 | |

EX.3

STAGE 1

M1

MULTIPLY
OPERAND READ

MA=88888888    02
MB=10000000    03
FRACTION      EXP.

STAGE 2

M2

PARTIAL SUM
BUILD

PS= ........
PC= ........
(DOUBLE WIDTH)

STAGE 3

M3

PRODUCT ADDITION
........
........
+ ........
IR2=08888888 80000000   05
         ↙SHIFT
         LEFT 1         04
FR=FE=88888888          EXP.
TRUNCATED               ADJ.
NORMALIZED
FRACTION

| STAGE 1 | STAGE 2 | STAGE 3 |
|---|---|---|
| MULTIPLY OPERAND READ | PARTIAL SUM BUILD | PRODUCT ADDITION |
| MA=88888888  02 | PS= ............ | ............ |
| MB=20000000  03 | PC= ............ | ............ |
| FRACTION   EXP. | (DOUBLE WIDTH) | IR=17777777  60000000  05 |
| | | + |
| | | FR=FE=17777777            05 |
| | | TRUNCATED       EXP. |
| | | NORMALIZED      ADJ. |
| | | FRACTION |

| STAGE 1 | STAGE 2 | STAGE 3 |
|---|---|---|
| MULTIPLY OPERAND READ<br><br>MA=88888888  −49<br>MB=10000000  −50<br>FRACTION    EXP. | PARTIAL SUM BUILD<br><br>PS= ..........<br>PC= ..........<br>(DOUBLE WIDTH) | PRODUCT ADDITION<br><br>    ..........<br>   +..........<br>   IR=17777777 60000000  −99<br>   FR=FE=17777777          −99<br>   TRUNCATED              EXP.<br>   NORMALIZED             ADJ.<br>   FRACTION |

FIG.11

EX.7
MULTIPLY(A)-ADD(B)

| STAGE 1 | STAGE 2 |
|---|---|
| A1<br>MULTIPLY<br>OPERAND READ<br><br>MA=88888888 02 (OPDI)<br>MB=10000000 03 (OPDII)<br>FRACTION EXP. | B1<br>ADDITION<br>OPERAND READ<br><br>FA=11111111 02 (OPD1)<br>FB=XXXXXXXX XX<br>FRACTION EXP. |
| | A2<br>PARTIAL SUM<br>BUILD<br><br>PS=........ ........<br>PC=........ ........<br>(DOUBLE WIDTH) |

① FEEDBACK OF IR1 WITH ONE EXTRA DIGIT

② ALIGNMENT EXTENDED BY ONE MORE DIGIT
(e.g. 2 GDs)

③ IR1 FROM MULTIPLY HAS A LEADING ZERO DIGIT;
→ SHIFT LEFT ONE DIGIT REQUIRED;
EXP. DECREMENTED BY ONE (05 → 04)

FIG.12A

EX.8
MULTIPLY(A)-ADD(B)

| STAGE 1 | STAGE 2 |
|---|---|
| A1<br>MULTIPLY<br>OPERAND READ<br><br>MA=88888888 02 (OPDI)<br>MB=20000000 03 (OPDII)<br>FRACTION EXP. | B1<br>ADDITION<br>OPERAND READ<br><br>FA=11111111 02 (OPD1)<br>FB=XXXXXXXX XX<br>FRACTION EXP. |
|  | A2<br>PARTIAL SUM<br>BUILD<br><br>PS=........ ........<br>PC=........ ........<br>(DOUBLE WIDTH) |

④ INDEPENTEND ZEROING OF GD
(WHEN FIRST DIGIT OF MULTIPLY RESULT
IS NOT ZERO)

⑤ TRUNCATION OF 2nd GD.
(NO SHIFT LEFT 1 DIGIT: ONLY THE 1st n+1
DIGITS COME INTO ADDITION.) →

FIG.13A

EX.9
MULTIPLY(A)-ADD(B)

| STAGE 1 | STAGE 2 |
|---|---|
| A1<br>MULTIPLY<br>OPERAND READ<br><br>MA=88888888 02 (OPDI)<br>MB=10000000 03 (OPDII)<br>FRACTION EXP. | B1<br>ADDITION<br>OPERAND READ<br><br>FA=11111111 02 (OPD1)<br>FB=XXXXXXXX XX<br>FRACTION EXP. |
| | A2<br>PARTIAL SUM<br>BUILD<br><br>PS=........ ........<br>PC=........ ........<br>(DOUBLE WIDTH) |

⑥ MULTIPLICATION RESULT REQUIRED WITH
ADDITIONAL GD, NO SHIFT LEFT.

FIG.14A

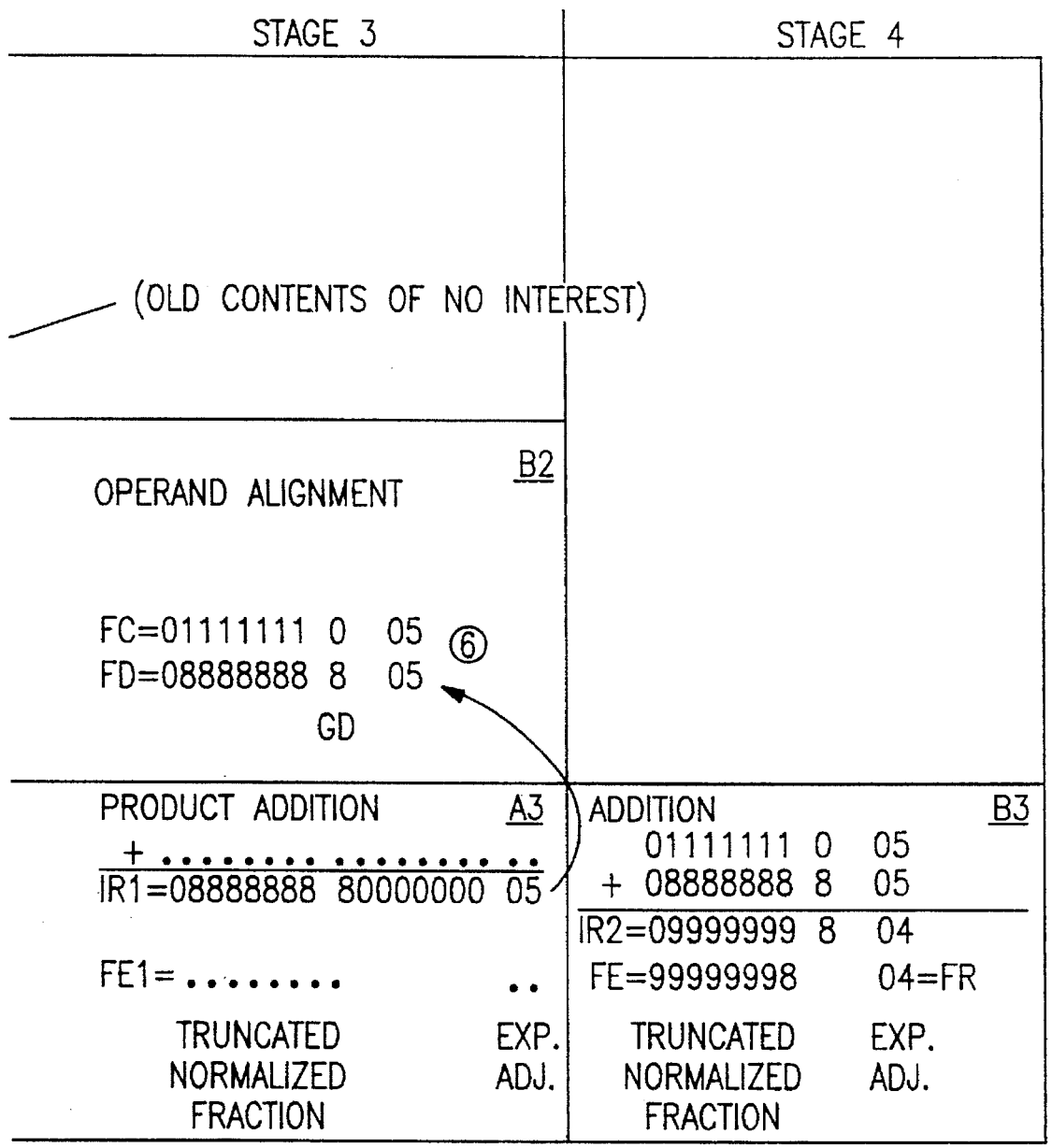
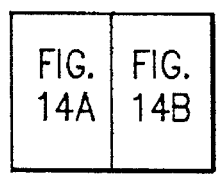
FIG.14B
FIG.14

EX.10
MULTIPLY(A)-ADD(B)

| STAGE 1 | STAGE 2 |
|---|---|
| <u>A1</u><br>MULTIPLY<br>OPERAND READ<br><br>MA=88888888 02 (OPDI)<br>MB=10000000 03 (OPDII)<br>FRACTION EXP. | <u>B1</u><br>ADDITION<br>OPERAND READ<br><br>FA=11111111 02 (OPD1)<br>FB=XXXXXXXX XX ←<br>FRACTION EXP. |
|  | <u>A2</u><br>PARTIAL SUM<br>BUILD<br><br>PS=........ ........<br>PC=........ ........<br>(DOUBLE WIDTH) |

⑦ EXPONENT RECOGNITIONS NEEDS ONE BIT MORE (Q BIT) AND CANCELLATION OF DATA FEED BACK WHEN TRUE ZERO.

FIG.15A

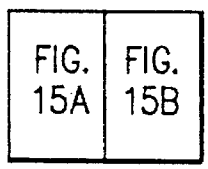

FAST MULTIPLY-ADD INSTRUCTION SEQUENCE IN A PIPELINE FLOATING-POINT PROCESSOR

BACKGROUND OF THE INVENTION

Technical Field

The invention is related to an arrangement and a method in a pipeline floating-point processor (FLPT) of improving the performance of a multiply-add sequence in which the multiplication is performed within three cycles: operand read, partial sums build, and add the partial sums to end result, and where the addition also needs three cycles: operand read, operands alignment, and addition.

Description of the Prior Art

Floating-point processors (FLPTS) are used to being functionally added to a main processor (CPU) for performing scientific applications. In the entry-level models (e.g. 9221) of the IBM Enterprise System/9000 (ES/9000) the floating-point processor is tightly coupled to the CPU and carries out all IBM System/390 floating-point instructions. All instructions are hardware-coded, so no microinstructions are needed. Moreover, binary integer multiplication is also implemented on the floating-point unit to improve overall performance.

FIG. 1 shows the data flow of the above mentioned floating point processor which is described in more detail in the IBM Journal of Research and Development, Vol. 36, Number 4, Jul. 1992. While the CPU is based on a four stage pipeline, the floating-point processor requires a five stage pipeline to perform its most used instructions, e.g. add, subtract, and multiply in one cycle for double-precision operands (reference should be made to "ESA/390 Architecture", IBM Form No.: G580-1017-00 for more detail).

The CPU resolves operand addresses, provides operands from the cache, and handles all exceptions for the floating-point processor. The five stages of the pipeline are instruction fetch, which is executed on the CPU, register fetch, operand realignment, addition, and normalization and register store.

To preserve synchronization with the CPU, a floating-point wait signal is raised whenever a floating-point instruction needs more than one cycle. The CPU then waits until this wait signal disappears before it increments its program counter and starts the next sequential instruction, which is kept on the bus.

Because the IBM System/390 architecture requires that interrupts be precise, a wait condition is also invoked whenever an exception may occur. As can further be seen from FIG. 1 many bypass busses are used to avoid wait cycles when the results of the foregoing instructions are used. A wait cycle is needed only if the result of one instruction is used immediately by the next sequential instruction (NSI), e.g. when an add instruction follows a multiply instruction, the result of which has to be augmented by the addend of the add instruction.

The data flow shown in FIG. 1 has two parallel paths for fraction processing: one add-path where all non-multiply/divide instructions are implemented, and one multiply path specially designed for multiply and divide. The add-path has a fixed (60) bit width and consists of an operand switcher, an aligner, an adder, and a normalizer shifter. Instead of using two aligners on each side of the operand paths, a switcher is used to switch operands, thereby saving one aligner. The switcher is also needed for other instructions, and so, requires much fewer circuitry.

The multiplier path consists of a booth encoder for the 58-bit multiplier, a multiplier macro which forms the 58×60 bit product terms sum and carry, and a 92-bit adder which delivers the result product. The sign and exponent paths are adjusted to be consistent with the add path. The exponent path resolves all exception and true zero situations, as defined by the earlier cited IBM System/390 architecture.

The implementation of all other instructions is merged into the add path and multiply path, and requires only minimal additional logic circuits. The data flow in FIG.1 therefore, shows more function blocks and multiplexer stages than needed for only add, subtract, and multiply operations.

As further can be seen from FIG. 1, the data flow is partitioned into smaller parts FA, FB, FC, FD, NM, MB, PS, PC, and PL (typically registers with their input control). These partitions and the partitioning of the floating-point instructions into three main groups are:

1.) addition/subtraction, load;

2.) multiplication; and

3.) division.

These are the instructions most used in scientific applications. The first two groups of instructions are performed in one cycle, and division is made as fast as possible.

For an add instruction, during the first two pipeline stages, only instruction and operand fetching are done. All data processing is concentrated in the third and fourth pipeline stages. In the fifth stage, the result is written back to a floating-point register.

Loading operations are treated like addition, with one operand equal to zero. During stage 3 the exponents of both operands are compared in order to determine the amount of alignment shift. The operand with the smaller exponent is then passed to the aligner for realignment. In stage 4 of the pipeline the aligned operands are added. The addition may produce a carry-out, which results in a shift right by one digit position, in accordance with the said architecture. The exponent is then decreased accordingly.

Since time is still available in stage 4, the exponent calculation is made sequentially after that of addition, using only one exponent adder with an input multiplexer (FIG. 1) to select whether an exponent increase, an exponent adjustment, or a multiply/divide exponent is required.

Leading-zero detection is made by calculating the hexadecimal digit sums without a propagated carry-in. Hexadecimal sums 0 and F for the digit position i are determined and fed into a multiplexer. The carry-in to this digit position selects whether or not the result digit is zero. This carry bit comes from the same carry-look ahead circuit used for the adder, so no additional circuit is needed. By using the above described logic, the shift amount can be determined at nearly the same time as the addition result.

Exponent exception, either overflow or underflow, is also detected in stage 4. Meanwhile, the next instruction has already been started. As earlier mentioned, a wait may be raised at stage 3 to hold execution of the next sequential instruction. In the case of an effective addition, the wait situation is met when the intermediate result exponent is 7F (hex) and will overflow when an exponent increment is caused by a carry-out from the adder;

the intermediate result exponent is smaller than 0D, and a normalization is required for unnormalized operands.

Here the exponent must be decreased by the normalization shift amount, which can be at most 0D (decimal 14), thus producing an exponent underflow.

Multiplication is implemented by using a modified Booth algorithm multiplier with serial addition of partial product terms. It is used to be performed within three instruction cycles in most of the high performance mathematical coprocessors:

1. Operand read,
2. Partial sums build and
3. Add partial sums to the end result.

Data bypass in the first and third cycles allows a saving of one cycle when using the same result for a following instruction. However, one wait cycle is still needed as can be seen from FIG. 3, where a multiply instruction is immediately followed by an add instruction which uses as addend or augment the result of the preceding multiplication.

In solving mathematical problems, especially in matrix calculations, the sequence multiply-add, where the add operation uses the result of the multiplication, is used very often.

RISC (reduced instruction set computer) systems, such as IBMs RS 6000, have a basic design which allows the combination of both operations in a single complex. However, this design does not conform with the ESA/390 architecture earlier cited. Old programs may deliver different results as from ESA/390 mode. To avoid this a single wait cycle has to be inserted.

In performance calculations the UNPACK loop is used very often, which consists of a sequence of five instructions:

1.) Load;
2.) Multiply;
3.) Add;
4.) Store; and
5.) Branch back.

The branch instruction is normally processed in zero-cycle so that the additional wait cycle would contribute to a performance degradation of 25%.

It is the object of this invention to increase the performance of pipeline floating-point processors, mainly when matrix calculations have to be performed, with their high quantity of multiply-add sequences using the result of the immediately preceding multiplication.

By applying the above features on a pipeline floating-point processor the advantage of a 25% performance increase for multiply-add instructions will be achieved.

SUMMARY OF THE INVENTION

A first embodiment of this invention is a floating point processor including registers for storing operands to be multiplied in a multiplier. The multiplier outputs to connected registers for storing the partial sums resulting from the multiplication. An adder is used to sum the partial sums. A normalizer connected to the adder normalizes the sum of the partial sums. Included is an add section containing registers for storing operands prior to an addition, and additional registers for storing the operands prior to an addition in a second adder. An aligner is connected between the registers for storing operands prior to an addition and a true complement unit and to one of the additional registers. A second aligner is connected between another of the registers for storing operands prior to an addition and another normalizer connected to the second adder's output for normalizing the final result. Also provided is a feedback path connecting an output of the normalizer to the aligners' inputs, a shifter connected between one aligner and the true complement unit, a zero setter connected between the true complement unit and one of the additional registers, and another shifter connected between the other aligner and another zero setter which is connected to the other additional register.

A second embodiment of this invention is a method of performing a fast multiply-add instruction in a floating point processor. The operands are read into input registers of a multiplier which then builds partial sums. A first operand of an addition is read simultaneously with calculating the exponent of the product and, if the product has a leading zero, reducing the exponent by one. The sum of the partial sums are then communicated to aligners via a feedback path and are properly aligned by comparing the exponents of the sum of the partial sums and the addend. The following decision tree is then carried out: if the product is true zero then an operand fed back from the multiplier is zero, if the exponent of the sum of the partial sums is less than or equal to the addend's exponent then the product is aligned, if the exponent of the sum of the partial sums is greater than the addend's exponent then the addend is aligned. Following this procedure, a potential guard digit of the product is set to zero if the product does not have a leading zero, but if the product does have a leading zero then both operands are shifted left by one digit and a least significant digit of an aligner becomes a guard digit of the result. Finally, both operands are aligned and added by a second adder to a final result of the fast multiply-add instruction.

A full understanding of the invention will be obtained from the detailed description of the presently preferred embodiment of the invention described herein below, and taken in conjunction with the accompanying drawings, which are given by way of example.

BRIEF DESCRIPTION OF THE DRAWINGS

FIG. 2a shows a schematic representation of various stages of a pipeline handling an add instruction.

FIG. 2b shows a schematic representation of various stages of a pipeline handling a multiply instruction.

FIG. 3 shows a schematic representation of various stages of a pipeline handling a multiply-add instruction sequence in a pipeline floating-point processor of FIG. 1.

FIG. 5 shows a schematic representation of the pipeline stages of a floating-point processor of FIG. 4 handling a multiply-add instruction sequence.

FIG. 8 depicts an example of a conventional multiply operation in a pipeline floating processor of FIG. 4 where the operands consist of a fraction and an exponent.

FIG. 9 depicts an example of a conventional multiply operation in a pipeline floating processor of FIG. 4 where the final result is truncated to normalize the number of positions.

FIG. 11 depicts an example of a conventional multiply operation in a pipeline floating processor of FIG. 4 with a simple truncation for forming the final result.

FIG. 14 depicts an example of the new multiply-add instruction in a pipeline floating point processor of FIG. 4 with intermediate operand storage.

DESCRIPTION OF THE PREFERRED EMBODIMENT

Figure 1:
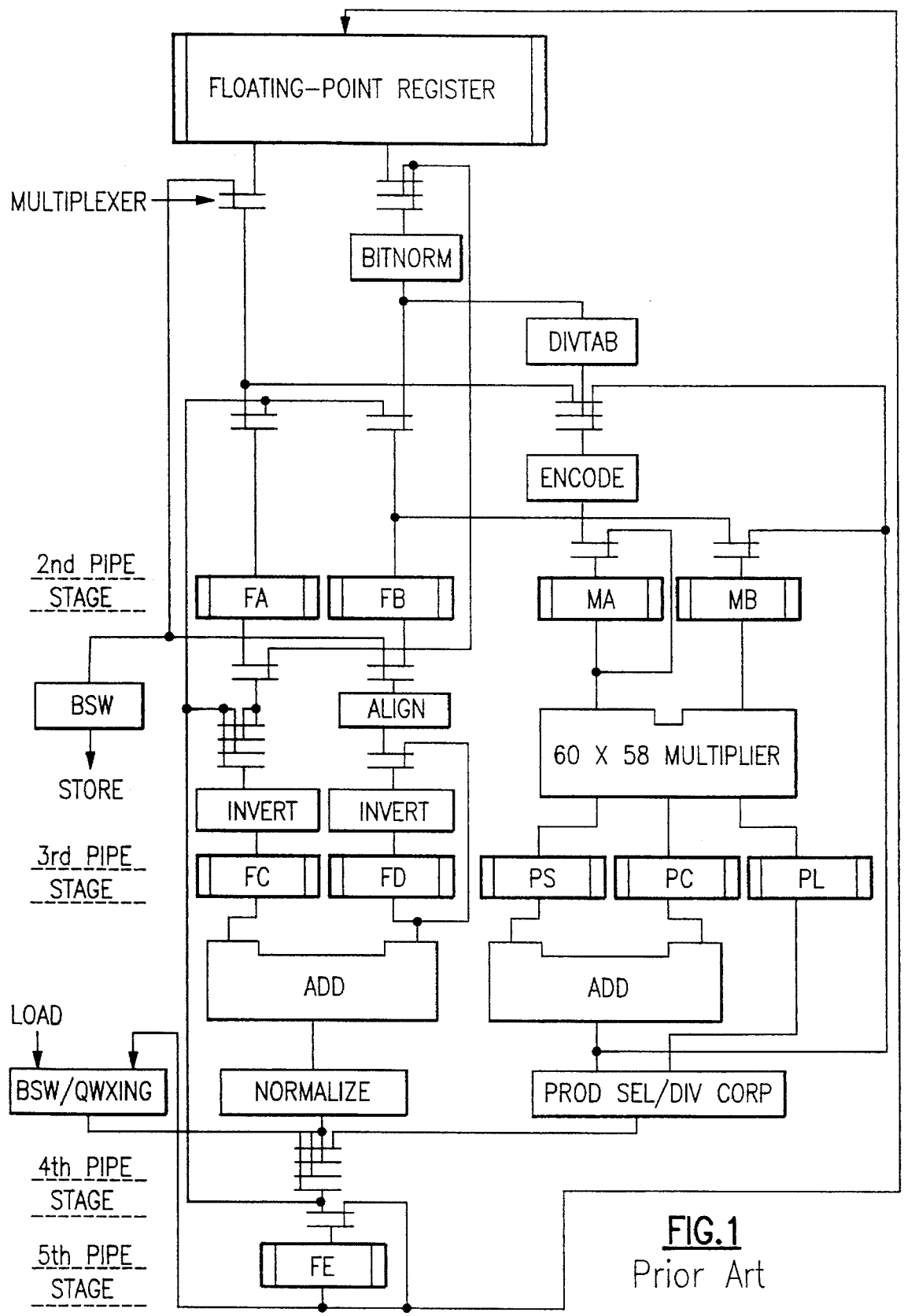
FIG. 1 illustrates a block diagram of a prior art pipeline floating-point processor.
Figure 4:
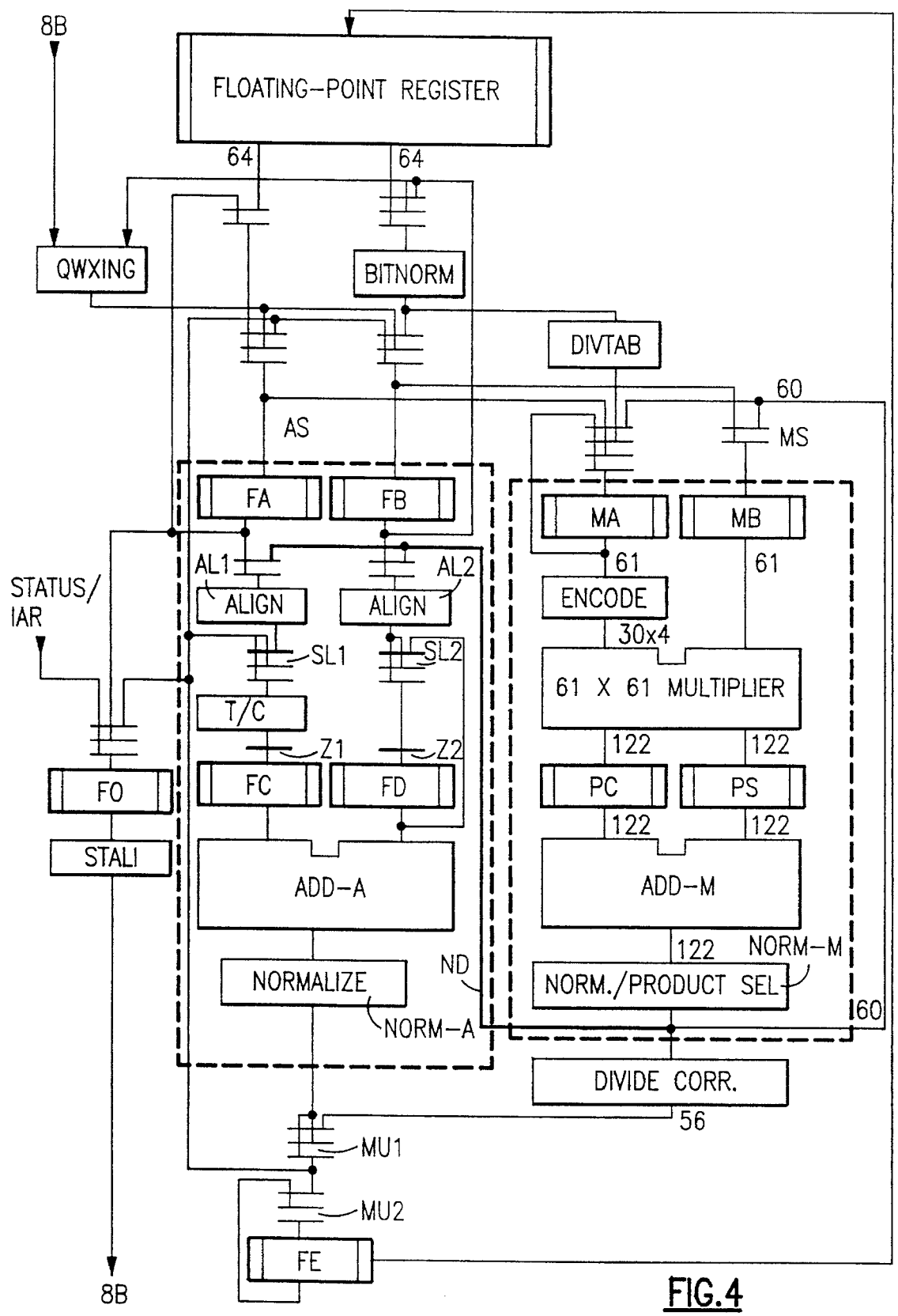
FIG. 4 illustrates a block diagram of a pipeline floating point processor, modified in accordance with the invention.
Figure 6:
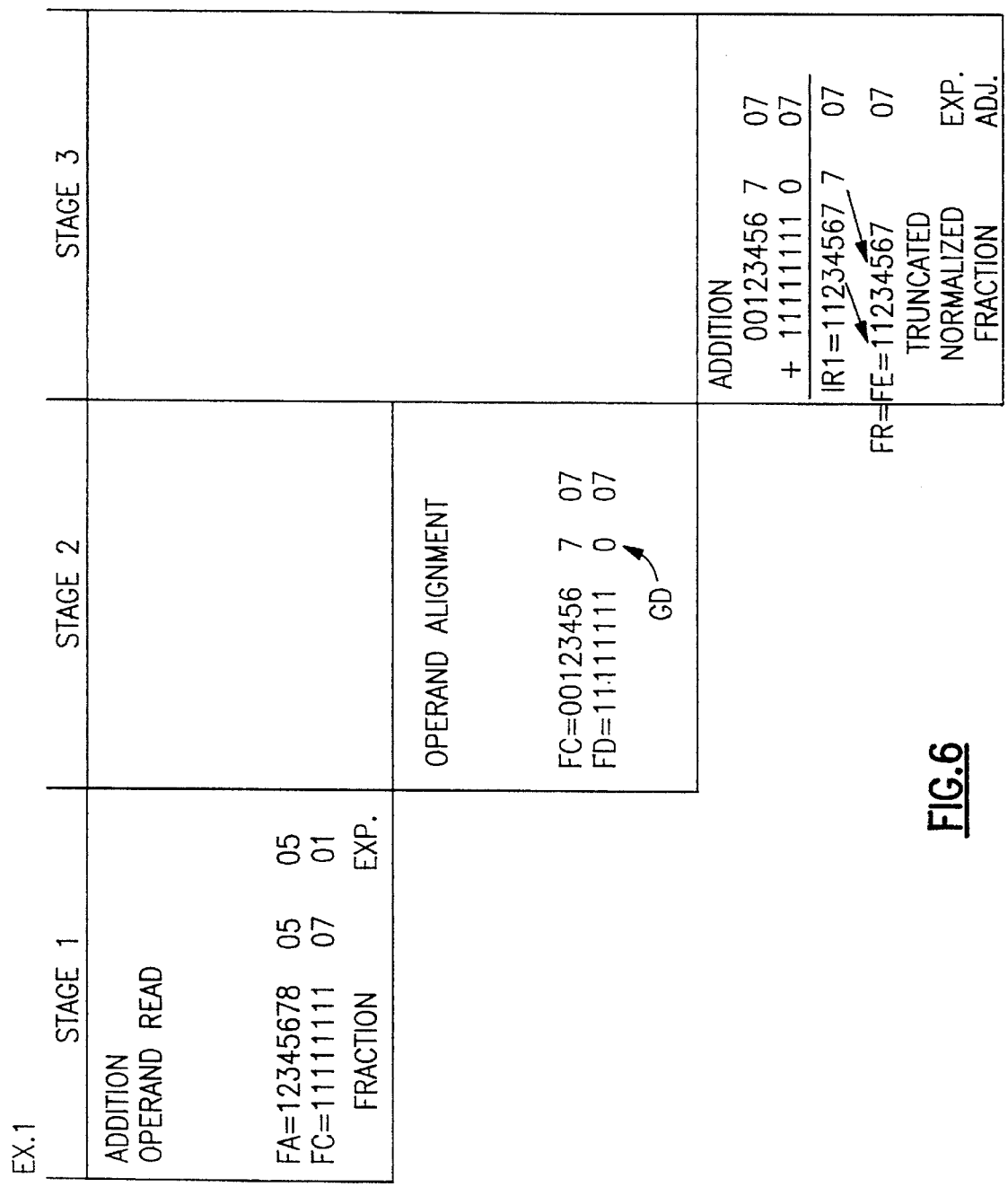
FIG. 6 depicts an example of a conventional add operation in a pipeline floating processor of FIG. 4.
Figure 7:
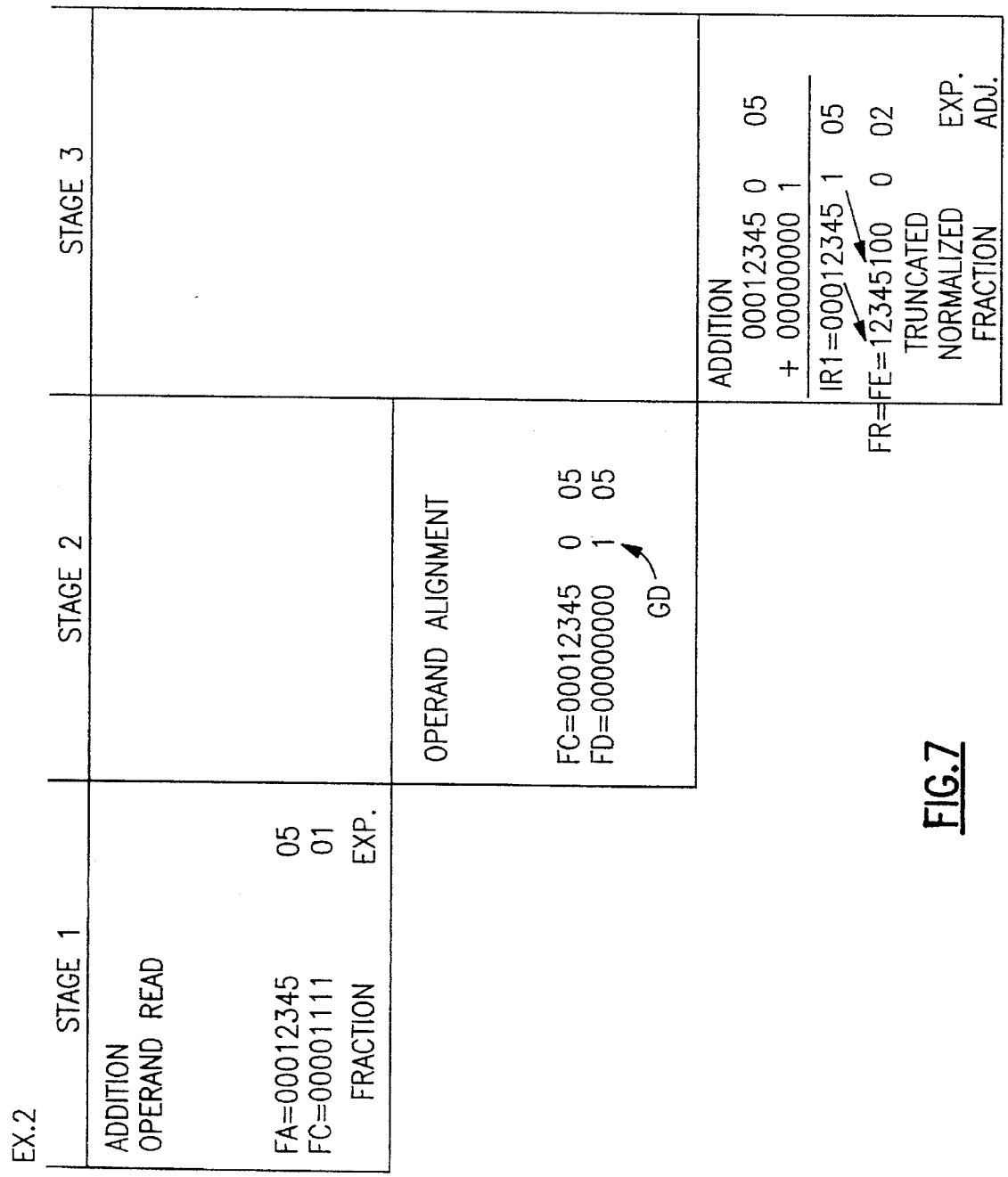
FIG. 7 depicts an example of another conventional addition in a pipeline floating processor of FIG. 4.
Figure 10:
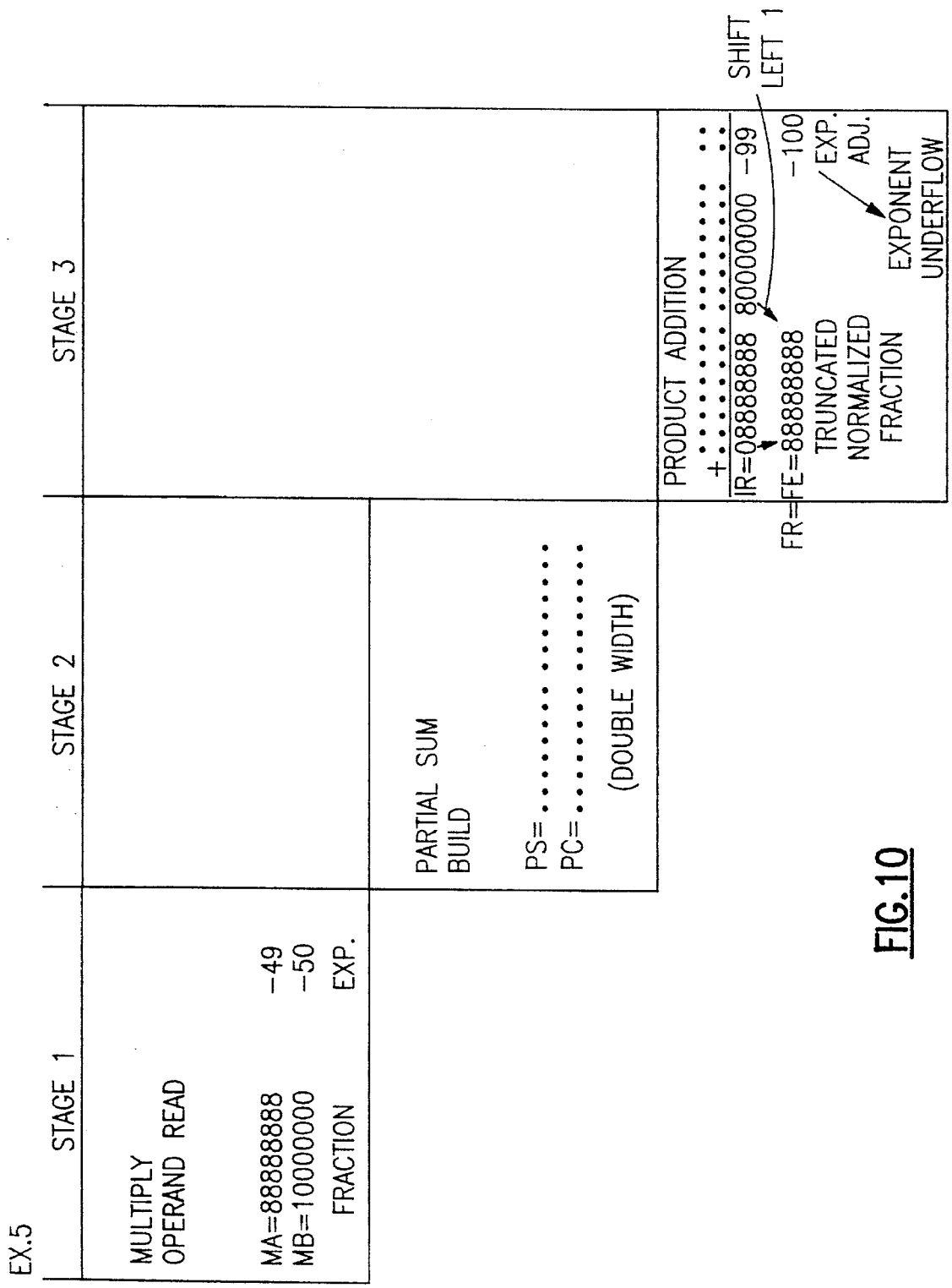
FIG. 10 depicts an example of a conventional multiply operation in a pipeline floating processor of FIG. 4 where the operands have negative exponents.
Figure 12B:
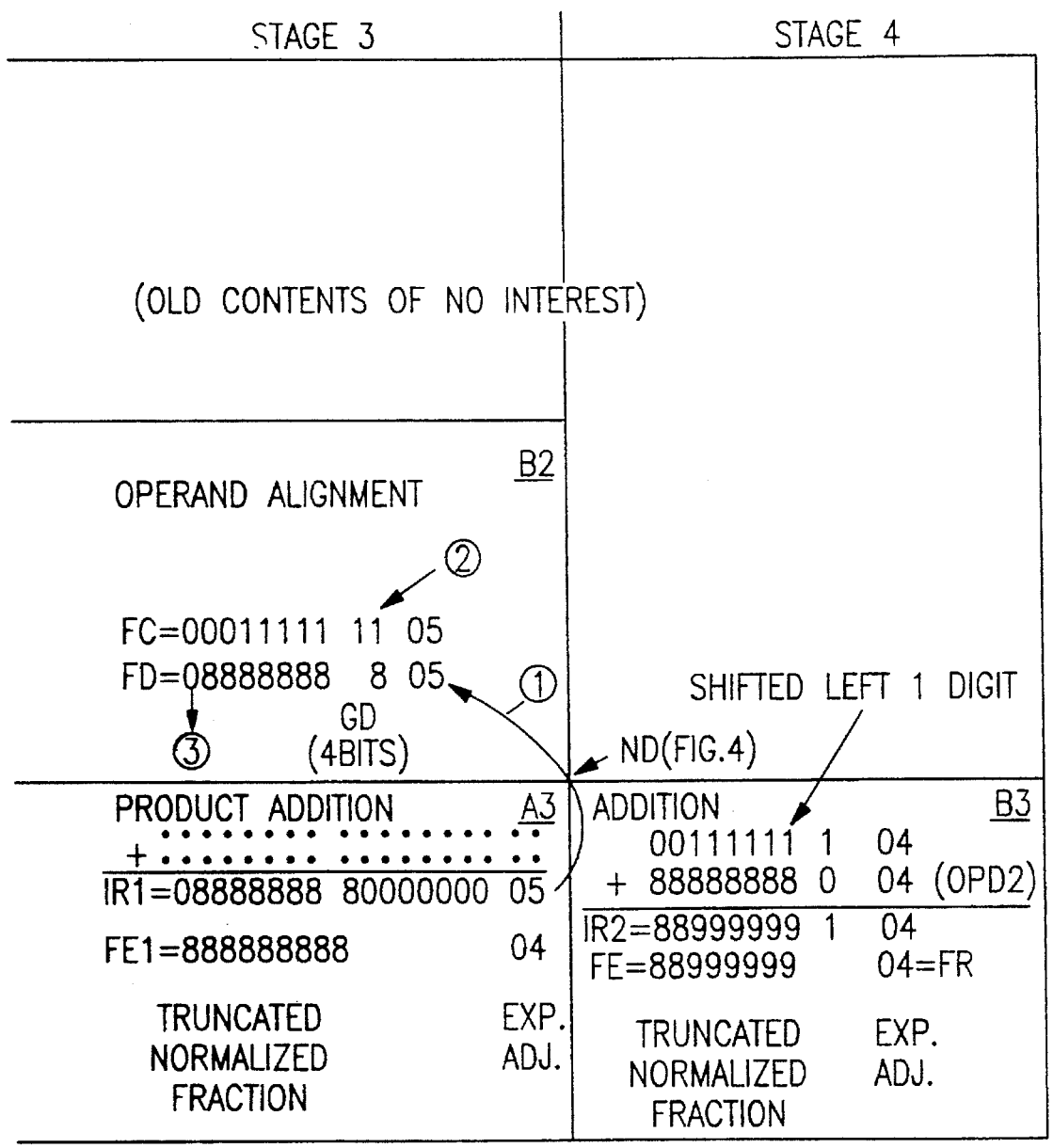
FIG. 12 depicts an example of the new multiply-add instruction in a pipeline floating point processor of FIG. 4.
Figure 12:
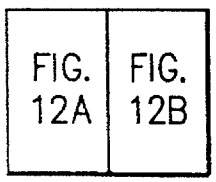
Figure 13B:
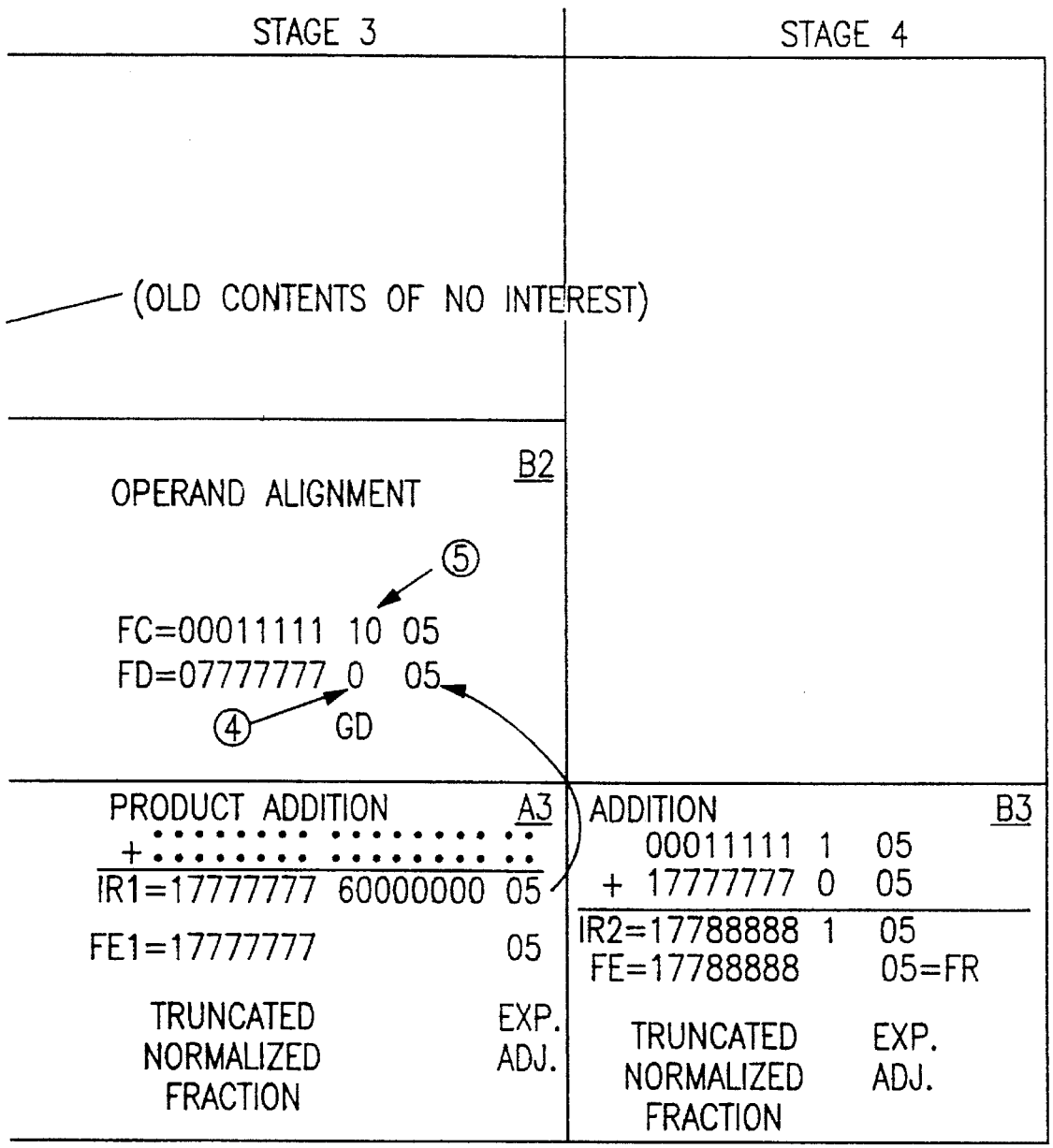
FIG. 13 depicts an example of the new multiply-add instruction in a pipeline floating point processor of FIG. 4 where it is necessary to truncate the fractional part of an operand.
Figure 13:
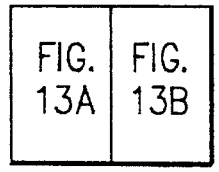
Figure 15B:
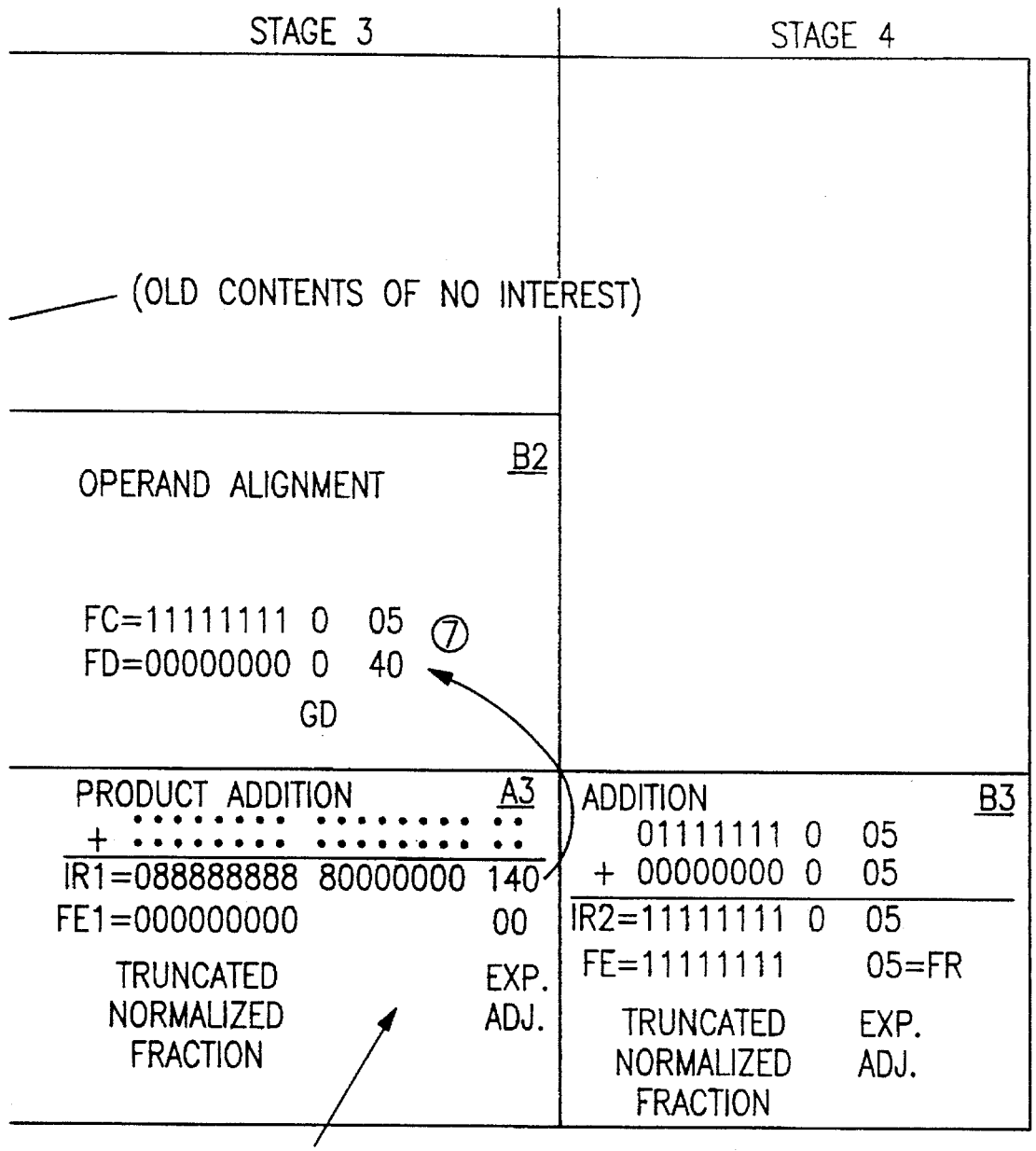
FIG. 15 depicts an example of the new multiply-add instruction in a pipeline floating point processor of FIG. 4 handling an exponent underflow.

The new data flow of a pipeline floating-point processor shown in FIG. 4 allows a zero wait processing of the multiply-add instruction sequence, as can be seen from FIG. 5, which is obtained by essentially four modifications:

1. Data feedback of normalized data from the multiplier M into the aligners AL1 and AL2 via feedback path ND;
2. Shift left one digit by SL1 and SL2 on both sides of the data path for taking account of a possible leading zero digit of the product (special zeroing of guard digits);
3. Exponent generation by 9 bits for overflow and underflow recognition in Z1 and Z2. Due to underflow the exponent result is reset to zero on the fly by true zero; and
4. Both aligners AL1 and AL2 are expanded to 16 digits.

For performing the fast multiply-add instruction sequence the following procedural steps are necessary (please refer to FIG. 5):

1. Read the operands OPDI and OPDII for performing a multiplication;
2. Calculate the intermediate exponent product and build the partial sums for multiplication in the multiply array M. At the same time read the operand OPD1 for the addition;
3. Add the partial sums of the multiply array to build the end product and feed the data back for the addition. In parallel a comparison of exponents is performed for an alignment in a 16-digit frame. An end alignment is then adjusted by one left shift if the leading digit of the product is zero. However, the following cases have to be envisaged:
    a) The product is true zero, so the operand coming from the multiplier array M is forced to zero;
    b) the intermediate product exponent is smaller than the OPD1 exponent, then the product is aligned and no further special actions have to be taken; and
    c) the intermediate exponent is greater than the OPD1 exponent, then the addend has to be aligned;

If the product does not have a leading zero, then the guard digit of the product has to be set to zero. But, if the product has a leading zero, then both operands (the result operand from the multiplication and OPD1) are shifted left by one digit and the 16th digit (in the example of the data flow of FIG. 5) of the aligner becomes the guard digit of the result.

4. When both operands are properly aligned, they will be added to the final result of the multiply-add instruction sequence without any need for a wait cycle (as can be seen from a comparison of FIG. 3 and FIG. 5).

The examples EX. 1–EX. 10 (FIG. 6–15) described below show for addition, multiplication and multiplication with immediately following addition, where one operand is the result of the preceding multiplication, various conditions under which the results have to be calculated and how the floating-point processor's data flow handles these situations in the different pipeline stages in accordance with FIGS. 2a, 2b, 3, and 5.

In a following first group of examples EX. 1–EX. 6 (FIG. 6–11) various conditions are shown which may occur during conventional add and multiply operations in a new floating point processor's data flow in accordance with FIG. 4.

EX. 1 (FIG. 6)

The operands OPD1 and OPD2 (augment and addend) are transferred to the intermediate adder input registers FA and FB during 'operand read' The operands consist of a fraction value and an exponent. As the exponents 05 and 07 do not match, a right shift of the lower exponent by two positions is necessary for operand alignment. This is done during 'operand alignment'. The underflow value 7 of operand OPDI is caught by a guard digit GD for being used later when the result (intermediate or final) of the addition has to be build during 'addition'. After alignment by the aligners AL1 and AL2 and after having passed through the shifters SL1 and SL2, and the true/complement unit T/C, which is interconnected between SL1 and zero detector Z1 the operands are stored in the input registers FC and FD of the adder ADD-A. ADD-A generates the intermediate result IR1 shown in example EX. 1.

A normalization of the fraction part of the result has to be performed by normalizer NORM-A which results in a truncated normalized fraction, and the exponents are adjusted. The final result/sum is then stored in output register FE. All these above operations are done in the 'addition'-pipeline stage of the floating-point processor.

EX. 2 (FIG. 7)

In example EX. 2 a further conventional addition is shown where operand OPD2 is smaller than operand OPDI. Therefore, the fraction of operand OPDI has to be shifted to the right by the difference (4) of the exponents (05, 01) for operand alignment. Again, the guard digit catches the underflow (1) of the shift operation. As the intermediate result IR1 of the addition has three leading zeros, a left shift by 3 is necessary, resulting in an exponent 02 of the final result FR, stored in adder output register FE.

EX. 3 (FIG. 8)

In example EX 3, a multiplication is depicted in which the operands OPDI and OPDII have been read into the multiplier input registers MA and MB. As in the previous examples the operands consist of a fraction and an exponent. The partial sums are build in the multiplier array M and intermediately stored in the multiplier output registers PC and PS. In the example the actual values are omitted for convenience reasons. The partial product addition leads to an intermediate result IR2 in which, however, one fraction part has a leading zero. This causes a left shift by 1 and an exponent adjustment 05→ 04. So, output register FE now contains the truncated, normalized fraction as well as the adjusted exponent.

EX. 4 (FIG. 9)

In this example shift operations do not seem necessary after product addition. Only a truncation is required to normalize the number of positions of the final result in output register FE.

EX. 5 (FIG. 10)

In example EX. 5, operands are shown having negative exponents (−49, −50) and fractions of OPDI larger than of OPDII. The fraction values do not seem to result in an overflow. As the example shows, a shift operation by 1 left of the intermediate result IR2 is only necessary for an exponent adjustment for the final result FR. However, an exponent underflow took place so that FR is true zero.

EX. 6 (FIG. 11)

EX. 6 shows a very simple example with negative operands where only a truncation of IR2 is necessary for forming the final result FR in register FE.

The following second group of examples EX. 7–EX. 10 (FIG. 12– 15) show the zero wait processing of the multiply-add instruction and the various procedural steps being performed in the different pipeline stages Stage 1–Stage 4.

EX. 7 (FIG. 12)

As can be seen, the multiplication requires three phases A1–A3, the same number of phases B1–B3 which are necessary for an addition. The whole operations therefore are performed within four pipeline stages Stage 1–Stage 4.

During phase A1 both operands OPDI and OPDII are read into the input registers MA and MB of the multiplier array M (pipeline stage 1).

In the next pipeline stage 2, phase A2 the partial sums of the multiplication are build and transferred subsequently into the multiplier output registers PC and PS for being added later. In the same pipeline stage 2, but phase B1 operand OPDI is read into an intermediate input register FA for adder ADD-A. The old contents of the other intermediate adder input register FB which was left there from a previous normal add instruction is in this case of no interest because the second operand (OPD2) for addition of a multiply-add instruction is being generated in the next pipeline stage 3, phase A3 by adding up the partial sums in adder ADD-M, thus giving the intermediate result IR1 which is fed-back via the feed-back path ND previously explained in context with FIG. 4, forming now operand OPD2.

As is shown in FIG. 4 the operands on their way to adder input registers FC and FD have, if necessary, to undergo alignment operations in aligners AL1, AL2 and shifters SL1, SL2, when the exponents do not match or zeroing operations in T/C, Z1, Z2, when leading zeros, guard digits GD included, have to be removed before the actual addition in adder ADD-A.

Some special situations are shown in EX. 7. As shown under (1), IR1 is fed-back via path ND with one extra digit GD (4 bits) in pipeline stage 3. The guard digit (GD=8) resulted from the product addition which took place in stage 3, phase A3.

Under (2) it is shown that the alignment of operand OPDI caused by a right shift by 3 positions resulted in an extended data width by, two GDs (1,1).

At the position of reference mark (3) it is shown that the operand transferred from IR1 to register FD has a leading zero which has to be removed by a left shift so that the resulting exponent Exp is changed from 05>04.

During stage 3, phase A3 further the contents of FE is truncated and normalized. This causes an exponent adjustment of −1 (05>04). For forming the final result in stage 4, phase B3, therefore a further left shift is necessary for exponent adjustment prior to the final addition operation. The result of the addition, intermediately stored in IR2, however, has still to be truncated and normalized. During this procedure a guard digit, if present has to be removed and the final result has to be transferred to FE, the output register containing the final result FR.

EX. 8 (FIG. 13)

In example EX. 8 special situations caused by operand values different from those discussed in EX. 7 are marked (4) and (5).

In (4) an independent zeroing of the guard digit GD in FD is required which is done in stage 3, phase B3.

In (5) it is necessary to truncate the fraction part of the operand in FC. This means that no left shift by one digit has to be made, so that only the n+l first digits come into addition.

EX. 9 (FIG. 14)

In example EX. 9 there is a special situation marked (6) shown where n stage 3, phase B2 the operand intermediately stored in FD -the result of the multiplication- requires an additional guard digit GD. As the exponents of both operands are already adjusted (both are 05), there is no subsequent shift operation required.

EX. 10 (FIG. 15)

In the final example EX. 10 it is shown under mark (7) how an exponent underflow is handled. An exponent underflow requires one bit (q) more and a cancellation of data feedback via path ND if a true zero situation was detected by the T/C unit.

We claim:

1. A floating point processor comprising:
   a multiply section having:
      a first input register and a second input register for intermediately storing first and second operands,
      a multiplier coupled to the first and second input registers for performing a multiplication of the first and second operands,
      adder output registers coupled to the multiplier for intermediately storing partial sums of the multiplication,
      a first adder coupled to the adder output registers for performing an addition of the partial sums, and
      a first normalizer connected to the first adder for normalizing a result of the addition of the partial sums; and
   an add section having:
      a third input register and a fourth input register for intermediately storing the first and second operands,
      a first aligner connected to said third input register for aligning the first operand,
      a first left shifter connected to the first aligner,
      a second aligner connected to said fourth input register for aligning the second operand,
      a second left shifter connected to the second aligner,
      a true/complement unit coupled to the first left shifter for operand true/complement building,
      a first zero setter connected to the true/complement unit,
      a first adder input register coupled to the first zero setter for intermediately storing an output of the first zero setter,
      a second zero setter connected to the second left shifter,
      a second adder input register coupled to the second zero setter for intermediately storing an output of the second zero setter,
      a second adder coupled to the first and second adder input registers for adding outputs of the first and second adder input registers,
      a second normalizer connected to said second adder for normalizing an output of said second adder; and
   a feedback path connecting said first normalizer to each of said first and second aligners.

2. (Amended) A method of performing a fast multiply-add instruction without requiring a wait cycle in a floating point processor comprising the steps of:
   (a) reading first and second operands for multiplication into first and second input registers of a multiplier;

(b) building partial sums of the first and second operands by the multiplier;

(c) calculating a product exponent and reducing the exponent by 1 if a product has a leading zero, including simultaneously reading an operand (addend) of an addition;

(d) adding the partial sums from the multiplier including feeding a resulting intermediate value (product) back to aligners via a feed-back path;

(e) comparing exponents of said product and, if they do not compare, performing a proper alignment;

(f) testing whether the following cases apply:
  i) if the product is true zero then said feeding back to aligners of step (d) is cancelled;
  ii) if the product exponent is smaller than or equal to the addend exponent, then the product is aligned;
  iii) if the product exponent is greater than the addend exponent, then the addend is aligned;

(g) setting a potential guard digit of the product to zero if the product does not have a leading zero;

(h) if the product has a leading zero, shifting both operands left by 1 digit and a least significant digit of an aligner becomes a guard digit of a result;

(i) aligning both the product and the addend including adding them in the second Adder forming a final result.

* * * * *